United States Patent
Masuda (10) Patent No.: US 10,221,998 B2
(45) Date of Patent: Mar. 5, 2019

(54) VEHICULAR AIR SUPPLY SYSTEM

(71) Applicant: Hino Motors, Ltd., Hino-shi (JP)

(72) Inventor: Satoshi Masuda, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 225 days.

(21) Appl. No.: 15/117,828

(22) PCT Filed: Mar. 4, 2015

(86) PCT No.: PCT/JP2015/056383
§ 371 (c)(1),
(2) Date: Aug. 10, 2016

(87) PCT Pub. No.: WO2015/137213
PCT Pub. Date: Sep. 17, 2015

(65) Prior Publication Data
US 2016/0369947 A1 Dec. 22, 2016

(30) Foreign Application Priority Data
Mar. 4, 2015 (JP) ................. 2014-047377

(51) Int. Cl.
*B60T 13/68* (2006.01)
*F17C 7/00* (2006.01)
(Continued)

(52) U.S. Cl.
CPC ............ *F17C 7/00* (2013.01); *B60G 11/27* (2013.01); *B60G 17/052* (2013.01);
(Continued)

(58) Field of Classification Search
CPC ........... B60G 2500/205; B60G 17/056; B60T 13/683; Y10T 137/2605; Y10T 137/2663
(Continued)

(56) References Cited

U.S. PATENT DOCUMENTS 6,089,831 A * 7/2000 Bruehmann ....... B60G 17/0523
303/3
6,149,246 A 11/2000 Terborn et al.
(Continued)

FOREIGN PATENT DOCUMENTS

CN 1880114 A 12/2006
CN 200964107 Y 10/2007
(Continued)

OTHER PUBLICATIONS

Combined Office Action and Search Report dated Mar. 2, 2017 in Chinese Patent Application No. 201580003340.2 (with English translation of categories of cited documents).
(Continued)

*Primary Examiner* — Kevin Murphy
(74) *Attorney, Agent, or Firm* — Oblon, McClelland, Maier & Neustadt, L.L.P.

(57) ABSTRACT

A vehicular air supply system includes: a first air operation mechanism which is operated at an air pressure of a first pressure value or less; a second air operation mechanism which is operated at an air pressure of a second pressure value or less, the second pressure value being lower than the first pressure value; a compressed air generator which generates compressed air to be supplied to the first air operation mechanism and the second air operation mechanism; and a first discharge air supply unit which supplies air discharged from the first air operation mechanism to the second air operation mechanism when a pressure value of the air discharged from the first air operation mechanism is higher than a pressure value of the air supplied from the compressed air generator to the second air operation mechanism.

9 Claims, 4 Drawing Sheets

(51) Int. Cl.
  *B60G 17/052* (2006.01)
  *B60G 11/27* (2006.01)
  *B60T 17/00* (2006.01)
  *B60T 17/02* (2006.01)
  *B60T 17/06* (2006.01)
  *F17C 13/08* (2006.01)
(52) U.S. Cl.
  CPC .......... *B60T 13/683* (2013.01); *B60T 17/004* (2013.01); *B60T 17/02* (2013.01); *B60T 17/06* (2013.01); *F17C 13/084* (2013.01); *B60G 2202/152* (2013.01); *B60G 2400/51222* (2013.01); *B60G 2500/20* (2013.01); *B60G 2500/202* (2013.01); *B60G 2500/205* (2013.01); *B60G 2600/02* (2013.01); *F17C 2221/031* (2013.01); *Y10T 137/2605* (2015.04)
(58) Field of Classification Search
  USPC .................................................. 280/124.16
  See application file for complete search history.

(56) References Cited

U.S. PATENT DOCUMENTS 6,276,761 B1 * 8/2001 Beck .................... B60T 11/326
                                              303/127
2007/0096554 A1 * 5/2007 Detlefs ................... B60T 17/02
                                                303/127
2012/0073669 A1 * 3/2012 Diekmeyer ........ B60G 17/0523
                                                  137/1

FOREIGN PATENT DOCUMENTS

| | | |
|---|---|---|
| CN | 203126448 U | 8/2013 |
| EP | 0 463 329 A1 | 1/1992 |
| JP | 2000-517266 A | 12/2000 |
| JP | 2010-121677 A | 6/2010 |
| JP | 2012-180020 A | 9/2012 |
| WO | 98/09859 | 3/1998 |

OTHER PUBLICATIONS

International Search Report dated Jun. 9, 2015 in PCT/JP2015/056383 filed Mar. 4, 2015.
International Preliminary Report on Patentability and Written Opinion dated Sep. 22, 2016 International Application No. PCT/JP2015/056383(English Translation only).
Extended European Search Report dated Jan. 17, 2017 in Patent Application No. 15762044.4.

* cited by examiner

VEHICULAR AIR SUPPLY SYSTEM

TECHNICAL FIELD

An aspect of the present invention relates to a vehicular air supply system.

BACKGROUND ART

For example, in a large vehicle, compressed air is used to operate various mechanisms such as a brake mechanism, an air suspension mechanism, and a transmission mechanism shifting gears by an air pressure. For this reason, such a vehicle is equipped with an air compressor that generates compressed air. This compressor is generally connected to an engine of the vehicle and is operated by driving power of the engine.

The air compressed by the compressor is stored in an air tank and is supplied to a brake mechanism or the like at a necessary timing. When the pressure of the air inside the air tank decreases, the compressed air is generated by the compressor and the compressed air is supplied to the air tank. A vehicle including a compressor and a suspension mechanism is disclosed in, for example, Patent Literature 1.

CITATION LIST

Patent Literature

Patent Literature 1: Japanese Unexamined Patent Publication No. 2012-180020

SUMMARY OF INVENTION

Technical Problem

In a system including the compressor and the brake mechanism, operated by the compressed air, mounted on the vehicle, there has been a strong demand for improving fuel efficiency by decreasing the operation frequency of the compressor so that a load applied to the engine decreases.

Here, an aspect of the present invention is to provide a vehicular air supply system capable of improving fuel efficiency by decreasing the operation frequency of the compressor.

Solution to Problem

A vehicular air supply system according to an aspect of the present invention includes: a first air operation mechanism which is operated at an air pressure of a first pressure value or less; a second air operation mechanism which is operated at an air pressure of a second pressure value or less, the second pressure value being lower than the first pressure value; a compressed air generator which generates compressed air to be supplied to the first air operation mechanism and the second air operation mechanism; and a first discharge air supply unit which supplies air discharged from the first air operation mechanism to the second air operation mechanism when a pressure value of the air discharged from the first air operation mechanism is higher than a pressure value of the air supplied from the compressed air generator to the second air operation mechanism.

In the vehicular air supply system, when the pressure value of the air discharged from the first air operation mechanism is higher than the pressure value of the air supplied from the compressed air generator to the second air operation mechanism, the air discharged from the first air operation mechanism is supplied to the second air operation mechanism. In this way, since the air discharged from the first air operation mechanism can be reused in the second air operation mechanism, the operation frequency of the compressed air generator can be suppressed. Thus, since the frequency of driving the compressed air generator by an engine or the like is suppressed, the fuel efficiency of the vehicle can be improved.

Advantageous Effects of Invention

According to an aspect of the present invention, it is possible to improve fuel efficiency by decreasing the operation frequency of the compressor.

DESCRIPTION OF EMBODIMENTS

Hereinafter, an embodiment of the present invention will be described with reference to the drawings. Further, the same reference signs will be given to the same components in the description of the drawings and the repetitive description thereof will be omitted.

Figure 1:
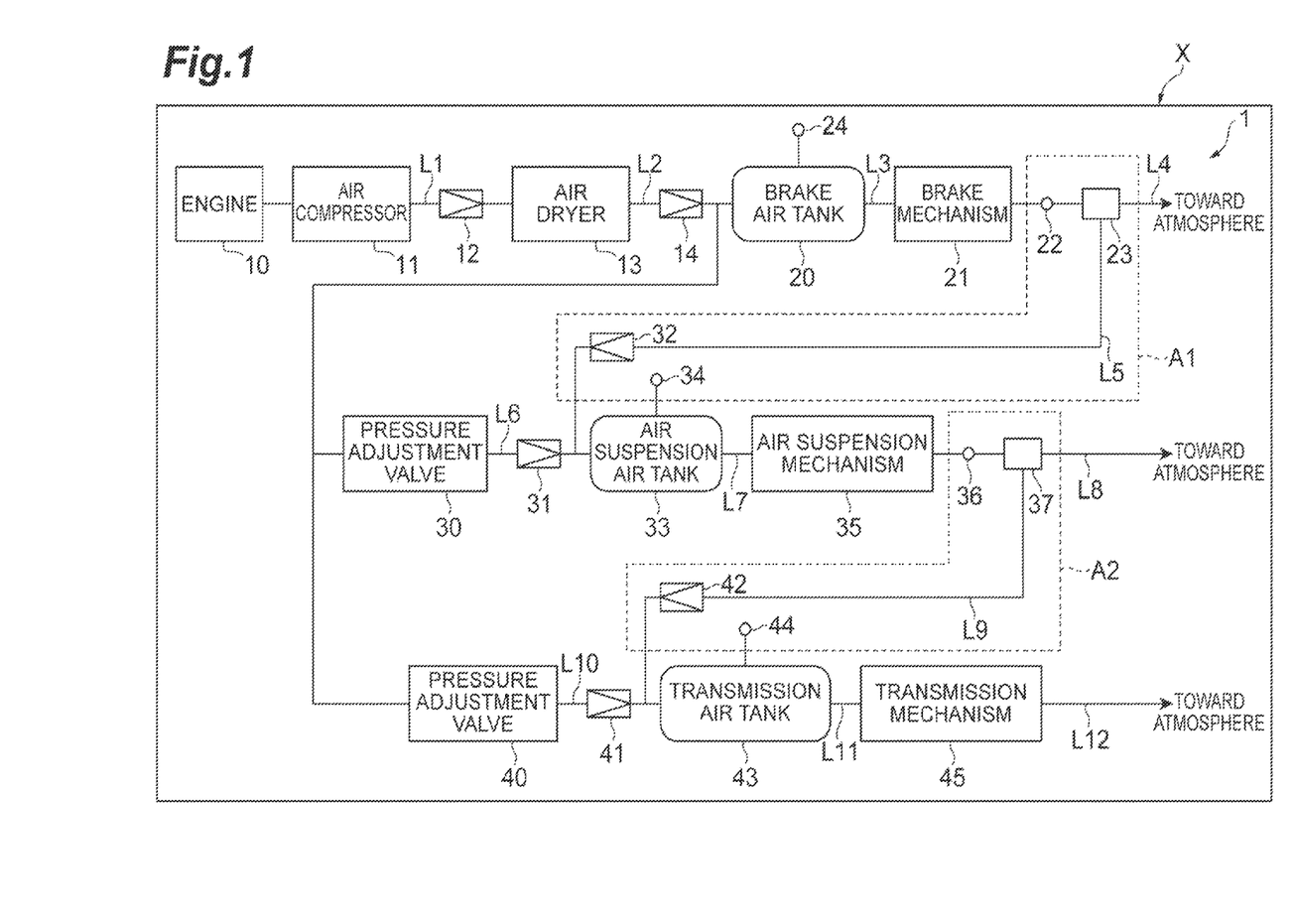
FIG. 1 is a diagram illustrating a schematic configuration of a vehicle equipped with a vehicular air supply system according to an embodiment.

As illustrated in FIG. 1, a vehicular air supply system 1 is mounted on a vehicle X and includes various mechanisms operated by air and a control system controlling these mechanisms. As an example, the vehicle X is a large vehicle such as a truck or a bus. Specifically, the vehicular air supply system 1 mainly includes an engine 10, an air compressor (a compressed air generator) 11, an air dryer 13, a brake air tank 20, a brake mechanism (a first air operation mechanism) 21, a first pressure sensor 24, a pressure adjustment valve 30, an air suspension air tank 33, an air suspension mechanism (a second air operation mechanism) 35, a pressure adjustment valve 40, a transmission air tank 43, a transmission mechanism (a third air operation mechanism) 45, a control unit 50 (see FIG. 2), a first discharge air supply unit A1, and a second discharge air supply unit A2.

The engine 10 is a power source of the vehicle X. As an example, liquid fuel is used as the fuel of the engine 10. The air compressor 11 is connected to a rotation shaft of the engine 10 and is driven by the engine 10 to generate compressed air. In the embodiment, the air compressor 11 generates compressed air having a pressure value of 15 kgf/cm$^2$ as an example. The compressed air generated by the air compressor 11 is supplied to the air dryer 13 through a pipe L1. The pipe L1 is provided with a one-way valve 12 which causes the compressed air to flow from the air compressor 11 only toward the air dryer 13. The air dryer 13 removes moisture contained in the compressed air.

The compressed air from which the moisture is removed by the air dryer 13 is supplied to the brake air tank 20, the pressure adjustment valve 30, and the pressure adjustment valve 40 through a pipe L2 branched in three ways. A one-way valve 14 which causes the compressed air to flow from the air dryer 13 only toward the brake air tank 20 is provided at the upstream position in relation to the branch point of the pipe L2.

The brake air tank 20 stores the compressed air for operating the brake mechanism 21. In the embodiment, the brake air tank 20 stores the compressed air in a state where the pressure value is 15 kgf/cm$^2$ or less as an example. The first pressure sensor 24 detects the pressure value of the compressed air stored in the brake air tank 20. The detection result of the first pressure sensor 24 is input to the control unit 50.

The compressed air stored in the brake air tank 20 is supplied to the brake mechanism 21 through a pipe L3. The brake mechanism 21 stops the rotation of a vehicle wheel of the vehicle X. The brake mechanism 21 is operated at an air pressure in which the pressure value of the compressed air is a first pressure value or less. In the embodiment, the first pressure value is set to 15 kgf/cm$^2$ as an example. The compressed air used by the brake mechanism 21 is discharged to the atmosphere through a pipe L4.

The first discharge air supply unit A1 supplies the compressed air discharged from the brake mechanism 21 to an air suspension mechanism 35 when the pressure value of the compressed air discharged from the brake mechanism 21 is higher than the pressure value of the compressed air supplied from the air compressor 11 to the air suspension mechanism 35. Specifically, the first discharge air supply unit A1 includes a second pressure sensor (a first sensor) 22, a three-way valve (a switching member) 23, a one-way valve 32, a third pressure sensor (a second sensor) 34, and a pipe L5.

The second pressure sensor 22 detects the pressure value of the compressed air flowing inside the pipe L4, that is, the compressed air discharged from the brake mechanism 21. The pressure value detected by the second pressure sensor 22 is input to the control unit 50. One end of the pipe L5 is connected to the pipe L4 and the other end of the pipe L5 is connected to a pipe L6 which supplies the compressed air to the air suspension air tank 33.

The three-way valve 23 is provided in a connection portion between one end of the pipe L5 and the pipe L4. The three-way valve 23 can switch an operation in which the compressed air discharged from the brake mechanism 21 is supplied to the air suspension air tank 33 through the pipe L5 and an operation in which the compressed air is discharged to the atmosphere through the pipe L4. The switching of the three-way valve 23 is controlled by the control unit 50.

The one-way valve 32 is provided in the pipe L5. The one-way valve 32 causes the compressed air to flow from the three-way valve 23 only toward the pipe L6. The third pressure sensor 34 detects the pressure value of the compressed air stored in the air suspension air tank 33. The pressure value detected by the third pressure sensor 34 is input to the control unit 50.

The pressure adjustment valve 30 adjusts (decreases) the pressure of the compressed air generated by the air compressor 11 so that the pressure value becomes a low pressure value. In the embodiment, the pressure adjustment valve 30 adjusts the pressure of the compressed air generated by the air compressor 11 so that the upper limit of the pressure value becomes 12 kgf/cm$^2$. The compressed air adjusted by the pressure adjustment valve 30 is supplied to the air suspension air tank 33 through the pipe L6. The pipe L6 is provided with a one-way valve 31 which causes the compressed air to flow from the pressure adjustment valve 30 only toward the air suspension air tank 33.

The air suspension air tank 33 stores the compressed air for operating the air suspension mechanism 35. In the embodiment, the air suspension air tank 33 stores the compressed air in a state where the pressure value is 12 kgf/cm$^2$ or less as an example. The compressed air stored in the air suspension air tank 33 is supplied to the air suspension mechanism 35 through a pipe L7. The air suspension mechanism 35 is a mechanism which absorbs the vibration of the vehicle wheel of the vehicle X and adjusts the vehicle height and is lengthened and shortened by the compressed air. The air suspension mechanism 35 is operated at an air pressure in which the pressure value of the compressed air is a second pressure value or less. In the embodiment, the second pressure value is set to 12 kgf/cm$^2$ as an example. The compressed air used by the air suspension mechanism 35 is discharged to the outside through a pipe L8.

The second discharge air supply unit A2 supplies the compressed air discharged from the air suspension mechanism 35 to the transmission mechanism 45 when the pressure value of the compressed air discharged from the air suspension mechanism 35 is higher than the pressure value of the compressed air supplied from the air compressor 11 to the transmission mechanism 45. Specifically, the second discharge air supply unit A2 includes a fourth pressure sensor (a first sensor) 36, a three-way valve (a switching member) 37, a one-way valve 42, a fifth pressure sensor (a second sensor) 44, and a pipe L9.

The fourth pressure sensor 36 detects the pressure value of the compressed air flowing inside the pipe L8, that is, the compressed air discharged from the air suspension mechanism 35. The pressure value detected by the fourth pressure sensor 36 is input to the control unit 50. One end of the pipe L9 is connected to the pipe L8 and the other end of the pipe L9 is connected to a pipe L10 which supplies the compressed air to the transmission air tank 43.

The three-way valve 37 is provided in a connection portion between one end of the pipe L9 and the pipe L8. The three-way valve 37 can switch an operation in which the compressed air discharged from the air suspension mechanism 35 is supplied to the transmission air tank 43 through the pipe L9 and an operation in which the compressed air is discharged to the atmosphere through the pipe L8. Further, the switching of the three-way valve 37 is controlled by the control unit 50.

The one-way valve 42 is provided in the pipe L9. The one-way valve 42 causes the compressed air to flow from the three-way valve 37 only toward the pipe L10. The fifth pressure sensor 44 detects the pressure value of the compressed air stored in the transmission air tank 43. The pressure value detected by the fifth pressure sensor 44 is input to the control unit 50.

The pressure adjustment valve 40 adjusts (decreases) the pressure of the compressed air generated by the air compressor 11 so that the pressure value becomes a low pressure value. In the embodiment, the pressure adjustment valve 40 adjusts the pressure of the compressed air generated by the air compressor 11 so that the upper limit of the pressure value becomes 10 kgf/cm$^2$. The compressed air adjusted by the pressure adjustment valve 40 is supplied to the transmission air tank 43 through the pipe L10. The pipe L10 is provided with a one-way valve 41 which causes the compressed air to flow from the pressure adjustment valve 40 only toward the transmission air tank 43.

The transmission air tank 43 stores the compressed air for operating the transmission mechanism 45. In the embodiment, the transmission air tank 43 stores the compressed air in a state where the pressure value is 10 kgf/cm$^2$ or less as an example. The compressed air stored in the transmission air tank 43 is supplied to the transmission mechanism 45 through a pipe L11. The transmission mechanism 45 shifts gears by the pressure of the compressed air. The transmission mechanism 45 is operated at an air pressure in which the pressure value of the compressed air is a third pressure value or less. In the embodiment, the third pressure value is set to 10 kgf/cm$^2$ as an example. The compressed air used by the transmission mechanism 45 is discharged to the atmosphere through a pipe L12.

Figure 2:
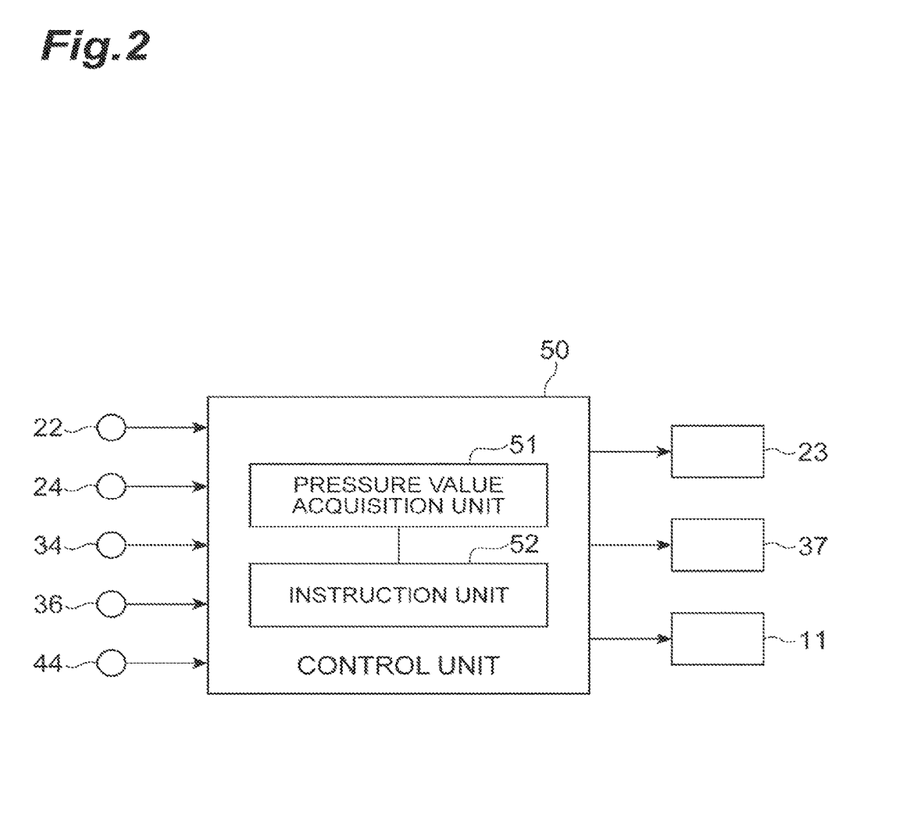
FIG. 2 is a block diagram illustrating a functional configuration of a control unit of FIG. 1.

The control unit 50 (see FIG. 2) is attached to a predetermined position of the vehicle X. As illustrated in FIG. 2, the control unit 50 functionally includes a pressure value acquisition unit 51 and an instruction unit 52. The pressure value acquisition unit 51 acquires the pressure values detected by the first pressure sensor 24, the second pressure sensor 22, the third pressure sensor 34, the fourth pressure sensor 36, and the fifth pressure sensor 44.

The instruction unit 52 controls the three-way valve 23, the three-way valve 37, and the air compressor 11 based on the pressure value acquired by the pressure value acquisition unit 51. First, a case will be described in which the control unit 50 controls the first discharge air supply unit A1 so that the compressed air discharged from the brake mechanism 21 is supplied to the air suspension air tank 33. The control unit 50 controls the three-way valve 23 so that the compressed air discharged from the brake mechanism 21 is supplied to the air suspension air tank 33 when the pressure value detected by the third pressure sensor 34 is a predetermined residual pressure value (for example, 5 kgf/cm$^2$) or less, the pressure value detected by the second pressure sensor 22 is higher than the pressure value detected by the third pressure sensor 34, and the differential pressure between the pressure value detected by the second pressure sensor 22 and the pressure value detected by the third pressure sensor 34 is a predetermined differential pressure value (for example, 5 kgf/cm$^2$) or more.

Specifically, the control unit 50 controls the three-way valve 23 so that the compressed air discharged from the brake mechanism 21 is supplied to the air suspension air tank 33 when the compressed air remaining in the air suspension air tank 33 is small (a predetermined residual pressure value or less), the pressure value of the compressed air discharged from the brake mechanism 21 is higher than the pressure value inside the air suspension air tank 33, and the differential pressure between the pressure value of the compressed air discharged from the brake mechanism 21 and the pressure value inside the air suspension air tank 33 is a predetermined differential pressure value or more.

Meanwhile, the control unit 50 controls the three-way valve 23 so that the compressed air discharged from the brake mechanism 21 is discharged to the atmosphere when the pressure value detected by the third pressure sensor 34 is not a predetermined residual pressure value (for example, 5 kgf/cm$^2$) or less. Further, the control unit 50 operates the air compressor 11 so that the compressed air is supplied to the air suspension air tank 33 when the pressure value detected by the third pressure sensor 34 is a predetermined residual pressure value (for example, 5 kgf/cm$^2$) or less and the differential pressure between the pressure value detected by the second pressure sensor 22 and the pressure value detected by the third pressure sensor 34 is not a predetermined differential pressure value (for example, 5 kgf/cm$^2$) or more.

Next, a case will be described in which the control unit 50 controls the second discharge air supply unit A2 so that the compressed air discharged from the air suspension mechanism 35 is supplied to the transmission air tank 43. The control unit 50 controls the three-way valve 37 so that the compressed air discharged from the air suspension mechanism 35 is supplied to the transmission air tank 43 when the pressure value detected by the fifth pressure sensor 44 is a predetermined residual pressure value (for example, 5 kgf/cm$^2$) or less, the pressure value detected by the fourth pressure sensor 36 is higher than the pressure value detected by the fifth pressure sensor 44, and the differential pressure between the pressure value detected by the fourth pressure sensor 36 and the pressure value detected by the fifth pressure sensor 44 is a predetermined differential pressure value (for example, 5 kgf/cm$^2$) or more.

Specifically, the control unit 50 controls the three-way valve 37 so that the compressed air discharged from the air suspension mechanism 35 is supplied to the transmission air tank 43 when the compressed air remaining inside the transmission air tank 43 is small (a predetermined residual pressure value or less), the pressure value of the compressed air discharged from the air suspension mechanism 35 is higher than the pressure value inside the transmission air tank 43, and the differential pressure between the pressure value of the compressed air discharged from the air suspension mechanism 35 and the pressure value inside the transmission air tank 43 is a predetermined differential pressure value or more.

Meanwhile, the control unit 50 controls the three-way valve 37 so that the compressed air discharged from the air suspension mechanism 35 is discharged to the atmosphere when the pressure value detected by the fifth pressure sensor 44 is not a predetermined residual pressure value (for example, 5 kgf/cm$^2$) or less. Further, the control unit 50 operates the air compressor 11 so that the compressed air is supplied to the transmission air tank 43 when the pressure value detected by the fifth pressure sensor 44 is a predetermined residual pressure value (for example, 5 kgf/cm$^2$) or less and the differential pressure between the pressure value detected by the fourth pressure sensor 36 and the pressure value detected by the fifth pressure sensor 44 is not a predetermined differential pressure value (for example, 5 kgf/cm$^2$) or more.

Further, the control unit 50 operates the air compressor 11 so that the compressed air is supplied to the brake air tank 20 when the pressure value detected by the first pressure sensor 24 is a predetermined residual pressure value (for example, 5 kgf/cm$^2$) or less.

Figure 3:
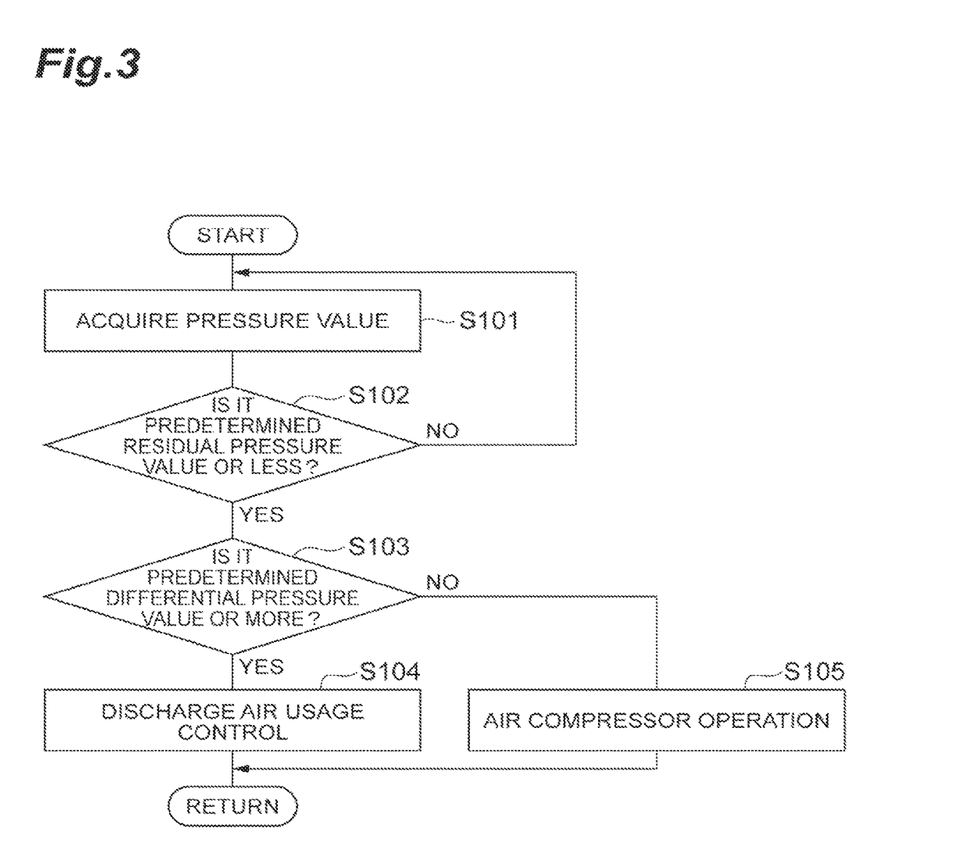
FIG. 3 is a flowchart illustrating a flow of a process performed by the control unit.

Next, a flow of a process in which the control unit 50 controls the first discharge air supply unit A1 and the second discharge air supply unit A2 will be described. First, a case will be described in which the control unit 50 controls the first discharge air supply unit A1. As illustrated in FIG. 3, the pressure value acquisition unit 51 of the control unit 50 first acquires the pressure value detected by the second pressure sensor 22 and acquires the pressure value of the compressed air inside the air suspension air tank 33 from the third pressure sensor 34 (step S101).

Next, the instruction unit 52 of the control unit 50 determines whether the pressure value detected by the third pressure sensor 34 is a predetermined residual pressure value or less (step S102). When the pressure value detected by the third pressure sensor 34 is not a predetermined residual pressure value or less (step S102: NO), the routine returns to step S101. Meanwhile, when the pressure value detected by the third pressure sensor 34 is a predetermined residual pressure value or less (step S102: YES), the control unit 50 determines whether the pressure value detected by the second pressure sensor 22 is higher than the pressure value detected by the third pressure sensor 34 and the differential pressure between the pressure value detected by the second pressure sensor 22 and the pressure value detected by the third pressure sensor 34 is a predetermined differential pressure value or more (step S103).

When the pressure value detected by the second pressure sensor 22 is higher than the pressure value detected by the third pressure sensor 34 and the differential pressure between the pressure values is a predetermined differential pressure value or more (step S103: YES), the control unit 50 controls the three-way valve 23 so that the compressed air discharged from the brake mechanism 21 is supplied to the air suspension air tank 33 (step S104). Accordingly, the compressed air discharged from the brake mechanism 21 is supplied to the air suspension air tank 33 and can be used in the air suspension mechanism 35.

Meanwhile, when the pressure value detected by the second pressure sensor 22 is not higher than the pressure value detected by the third pressure sensor 34 or the differential pressure between the pressure value detected by the second pressure sensor 22 and the pressure value detected by the third pressure sensor 34 is not a predetermined differential pressure value or more (step S103: NO), the control unit 50 operates the air compressor 11 (step S105). Accordingly, the compressed air generated by the air compressor 11 is supplied to the air suspension air tank 33.

A flow of a process in which the control unit 50 controls the second discharge air supply unit A2 is similar to a flow of a process in which the control unit 50 controls the first discharge air supply unit A1, and hence a description using FIG. 3 will be omitted.

The embodiment has the above-described configuration and the first discharge air supply unit A1 supplies the compressed air discharged from the brake mechanism 21 to the air suspension mechanism 35 when the pressure value of the compressed air discharged from the brake mechanism 21 is higher than the pressure value of the compressed air supplied from the air compressor 11 to the air suspension mechanism 35. In this way, since the compressed air discharged from the brake mechanism 21 can be reused in the air suspension mechanism 35, the operation frequency of the air compressor 11 can be suppressed. When a control similar to the first discharge air supply unit A1 is also performed on the second discharge air supply unit A2, the operation frequency of the air compressor 11 can be suppressed. Thus, the frequency of driving the air compressor 11 by the engine 10 is suppressed and hence the fuel efficiency of the vehicle X can be improved.

The compressed air discharged from the brake mechanism 21 and supplied to the air suspension mechanism 35 by the first discharge air supply unit A1 is stored in the air suspension air tank 33. Accordingly, the air suspension mechanism 35 can use the air discharged from the brake mechanism 21 and stored in the air suspension air tank 33 even when a timing in which the compressed air is discharged from the brake mechanism 21 is deviated from a timing in which the compressed air is necessary for the air suspension mechanism 35. Further, the same applies to the compressed air discharged from the air suspension mechanism 35 and supplied to the transmission mechanism 45.

Based on the detection result of the second pressure sensor 22 and the third pressure sensor 34, the control unit 50 controls the three-way valve 23. Accordingly, the vehicular air supply system 1 can automatically switch an operation in which the compressed air discharged from the brake mechanism 21 is supplied to the air suspension air tank 33 and an operation in which the compressed air is discharged to the atmosphere. Similarly, the control unit 50 controls the three-way valve 37 based on the detection result of the fourth pressure sensor 36 and the fifth pressure sensor 44. Accordingly, the vehicular air supply system 1 can automatically switch an operation in which the compressed air discharged from the air suspension mechanism 35 is supplied to the transmission air tank 43 and an operation in which the compressed air is discharged to the atmosphere.

The first discharge air supply unit A1 supplies the compressed air discharged from the brake mechanism 21 to the air suspension air tank 33 when the pressure value of the air suspension air tank 33 is a predetermined residual pressure value or less. In this case, the air suspension air tank 33 can be charged by the compressed air discharged from the brake mechanism 21 instead of, for example, an operation in which the air compressor 11 is operated so that the air suspension air tank 33 is charged by the compressed air. Similarly, the second discharge air supply unit A2 supplies the compressed air discharged from the air suspension mechanism 35 to the transmission air tank 43 when the pressure value of the transmission air tank 43 is a predetermined residual pressure value or less. In this case, the transmission air tank 43 can be charged by the compressed air discharged from the air suspension mechanism 35 instead of, for example, an operation in which the air compressor 11 is operated so that the transmission air tank 43 is charged by the compressed air.

When the first discharge air supply unit A1 supplies the compressed air discharged from the brake mechanism 21 to the air suspension mechanism 35, the compressed air discharged from the brake mechanism 21 can be effectively reused in the air suspension mechanism 35. Similarly, when the second discharge air supply unit A2 supplies the compressed air discharged from the air suspension mechanism 35 to the transmission mechanism 45, the compressed air discharged from the air suspension mechanism 35 can be effectively reused in the transmission mechanism 45.

Figure 4:
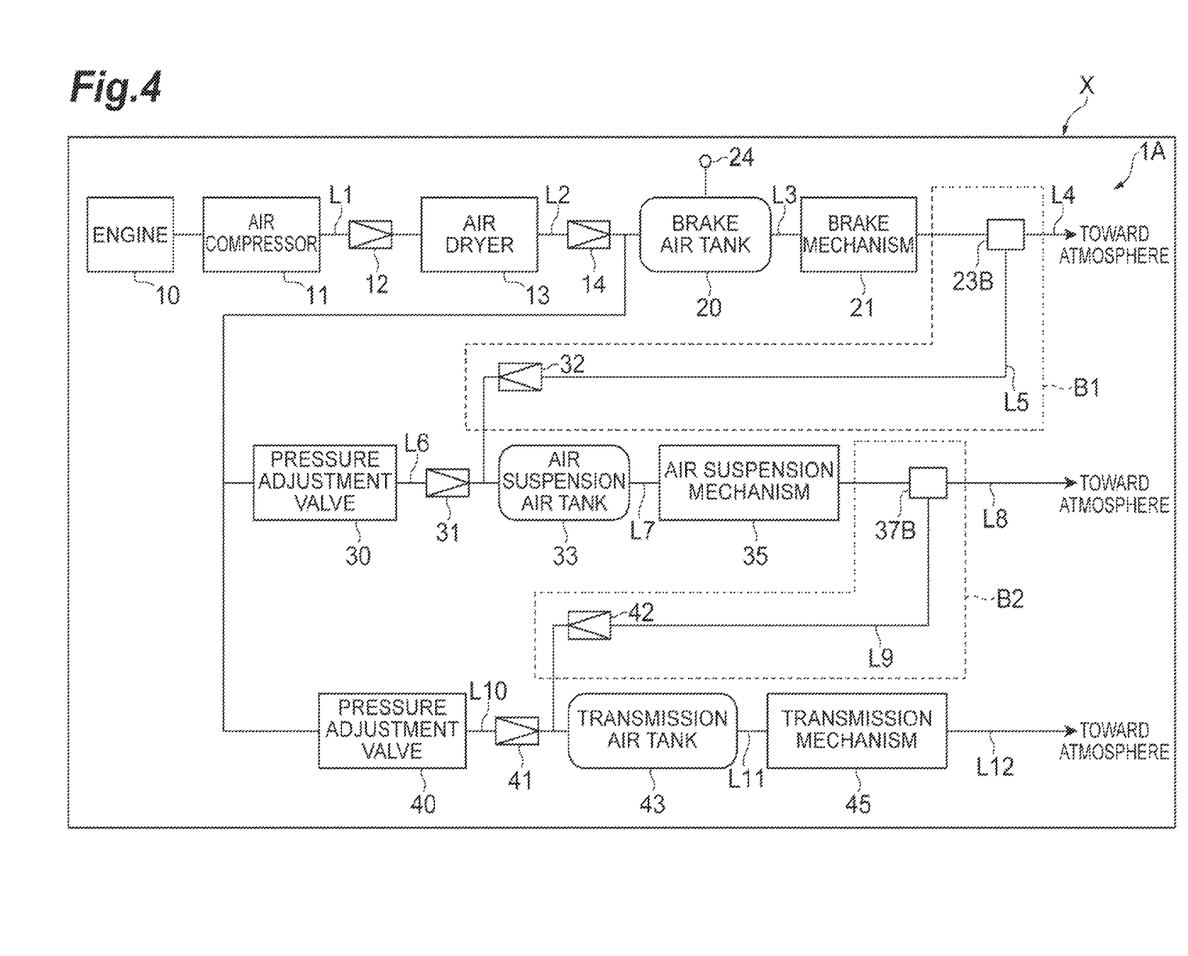
FIG. 4 is a diagram illustrating a schematic configuration of a vehicle equipped with a vehicular air supply system according to a modified example.

While the embodiment of the present invention has been described, the present invention is not limited to the above-described embodiment. For example, as illustrated in FIG. 4, a vehicular air supply system 1A including a first discharge air supply unit B1 and a second discharge air supply unit B2 having a different configuration instead of the first discharge air supply unit A1 and the second discharge air supply unit A2 described in the embodiment may be used. Specifically, the first discharge air supply unit B1 includes a differential pressure valve 23B, the one-way valve 32, and the pipe L5.

The differential pressure valve 23B supplies the compressed air discharged from the brake mechanism 21 to the air suspension air tank 33 when the differential pressure between the pressure value of the compressed air discharged from the brake mechanism 21 and the pressure value of the compressed air inside the air suspension air tank 33 is a predetermined differential pressure value (for example, 5 kgf/cm$^2$) or more. Further, the differential pressure valve 23B discharges the compressed air discharged from the brake mechanism 2 to the atmosphere when the differential pressure between the pressure value of the compressed air discharged from the brake mechanism 21 and the pressure value of the compressed air inside the air suspension air tank 33 is not a predetermined pressure value or more.

Similarly, a differential pressure valve 37B supplies the compressed air discharged from the air suspension mechanism 35 to the transmission air tank 43 when the differential pressure between the pressure value of the compressed air discharged from the air suspension mechanism 35 and the pressure value of the compressed air inside the transmission air tank 43 is a predetermined differential pressure value (for example, 5 kgf/cm²) or more. Further, the differential pressure valve 37B discharges the compressed air discharged from the air suspension mechanism 35 to the atmosphere when the differential pressure between the pressure value of the compressed air discharged from the air suspension mechanism 35 and the pressure value of the compressed air inside the transmission air tank 43 is not a predetermined pressure value or more.

In this way, when the differential pressure valve 23B is used, the vehicular air supply system 1A can automatically switch an operation in which the compressed air discharged from the brake mechanism 21 is supplied to the air suspension air tank 33 and an operation in which the compressed air is discharged to the atmosphere. Similarly, when the differential pressure valve 37B is used, the vehicular air supply system 1A can automatically switch an operation in which the compressed air discharged from the air suspension mechanism 35 is supplied to the transmission air tank 43 and an operation in which the compressed air is discharged to the atmosphere.

In addition, the differential pressure valve 23B may supply the compressed air from the brake mechanism 21 to the air suspension air tank 33 only when the pressure value inside the air suspension air tank 33 is a predetermined residual pressure value or less. Similarly, the differential pressure valve 37B may supply the compressed air from the air suspension mechanism 35 to the transmission mechanism 45 only when the pressure value inside the transmission air tank 43 is a predetermined residual pressure value or less.

In the above-described embodiment and the modified example, although the brake mechanism 21, the air suspension mechanism 35, and the transmission mechanism 45 are used as the operation mechanisms operated by the compressed air, the invention is not limited thereto and the number of the operation mechanisms is not limited to three. Further, a configuration has been employed in which the brake mechanism 21 is operated at the highest pressure and the transmission mechanism 45 is operated at the lowest pressure, but the operation pressure sequence is not limited thereto.

The compressed air discharged from the brake mechanism 21, the air suspension mechanism 35, and the transmission mechanism 45 is discharged to the atmosphere in response to a condition, but may be supplied to a portion other than the atmosphere.

INDUSTRIAL APPLICABILITY

According to an aspect of the present invention, it is possible to improve fuel efficiency by decreasing the operation frequency of the compressor.

REFERENCE SIGNS LIST 1, 1A Vehicular air supply system, 11 Air compressor (compressed air generator), 21 Brake mechanism (first air operation mechanism), 22 Second pressure sensor (first sensor), 23 Three-way valve (switching member), 23B Differential pressure valve, 33 Air suspension air tank, 34 Third pressure sensor (second sensor), 35 Air suspension mechanism (second air operation mechanism), 36 Fourth pressure sensor (first sensor), 37 Three-way valve (switching member), 37B Differential pressure valve, 43 Transmission air tank, Fifth pressure sensor (second sensor), 45 Transmission mechanism (third air operation mechanism), 50 Control unit, A1 First discharge air supply unit, A2 Second discharge air supply unit, X Vehicle

The invention claimed is:

1. A vehicular air supply system comprising:
a first air operation mechanism which is operated at an air pressure of a first pressure value or less;
a second air operation mechanism which is operated at an air pressure of a second pressure value or less, the second pressure value being lower than the first pressure value;
a compressed air generator which generates compressed air to be supplied to the first air operation mechanism and the second air operation mechanism;
a first discharge air supply unit which supplies air discharged from the first air operation mechanism to the second air operation mechanism when a pressure value of the air discharged from the first air operation mechanism is higher than a pressure value of the air supplied from the compressed air generator to the second air operation mechanism;
an air tank which stores the air generated by the compressed air generator at the second pressure value or less and supplies the stored air to the second air operation mechanism,
wherein the first discharge air supply unit supplies the air discharged from the first air operation mechanism to the air tank when a differential pressure between the pressure value of the air discharged from the first air operation mechanism and a pressure value of the air inside the air tank is a predetermined differential pressure value or more,
wherein the first discharge air supply unit includes
a first sensor which detects the pressure value of the air discharged from the first air operation mechanism,
a second sensor which detects the pressure value inside the air tank,
a switching member which is able to switch an operation in which the air discharged from the first air operation mechanism is supplied to the air tank and an operation in which the air discharged from the first air operation mechanism is supplied to a portion other than the second air operation mechanism, and
a control unit which controls the switching member so that the air discharged from the first air operation mechanism is supplied to the air tank when the differential pressure between the pressure value detected by the first sensor and the pressure value detected by the second sensor is the predetermined differential pressure value or more and controls the switching member so that the air discharged from the first air operation mechanism is supplied to a portion other than the second air operation mechanism when the differential pressure between the pressure value detected by the first sensor and the pressure value detected by the second sensor is not the predetermined differential pressure value or more.

2. The vehicular air supply system according to claim 1, wherein the first discharge air supply unit discharges the air discharged from the first air operation mechanism to an atmosphere other than the second air operation mechanism.

3. The vehicular air supply system according to claim 1, wherein the first discharge air supply unit supplies the air discharged from the first air operation mechanism to the air tank when the pressure value inside the air tank is a predetermined residual pressure value or less.

4. The vehicular air supply system according to claim 1, wherein at least one of the first air operation mechanism and the second air operation mechanism is any one of a brake mechanism, an air suspension mechanism, and a transmission mechanism shifting gears by an air pressure.

5. A vehicular air supply system comprising:
a first air operation mechanism which is operated at an air pressure of a first pressure value or less;
a second air operation mechanism which is operated at an air pressure of a second pressure value or less, the second pressure value being lower than the first pressure value;
a compressed air generator which generates compressed air to be supplied to the first air operation mechanism and the second air operation mechanism;
a first discharge air supply unit which supplies air discharged from the first air operation mechanism to the second air operation mechanism when a pressure value of the air discharged from the first air operation mechanism is higher than a pressure value of the air supplied from the compressed air generator to the second air operation mechanism;
an air tank which stores the air generated by the compressed air generator at the second pressure value or less and supplies the stored air to the second air operation mechanism,
wherein the first discharge air supply unit supplies the air discharged from the first air operation mechanism to the air tank when a differential pressure between the pressure value of the air discharged from the first air operation mechanism and a pressure value of the air inside the air tank is a predetermined differential pressure value or more, and
wherein the first discharge air supply unit includes a differential pressure valve which supplies the air discharged from the first air operation mechanism to the air tank when the differential pressure between the pressure value of the air discharged from the first air operation mechanism and the pressure value of the air inside the air tank is the predetermined differential pressure value or more and supplies the air discharged from the first air operation mechanism to a portion other than the second air operation mechanism when the differential pressure between the pressure value of the air discharged from the first air operation mechanism and the pressure value of the air inside the air tank is not the predetermined pressure value or more.

6. The vehicular air supply system according to claim 5, wherein the first discharge air supply unit discharges the air discharged from the first air operation mechanism to an atmosphere other than the second air operation mechanism.

7. The vehicular air supply system according to claim 5, wherein the first discharge air supply unit supplies the air discharged from the first air operation mechanism to the air tank when the pressure value inside the air tank is a predetermined residual pressure value or less.

8. The vehicular air supply system according to claim 5, wherein at least one of the first air operation mechanism and the second air operation mechanism is any one of a brake mechanism, an air suspension mechanism, and a transmission mechanism shifting gears by an air pressure.

9. A vehicular air supply system comprising:
a first air operation mechanism which is operated at an air pressure of a first pressure value or less;
a second air operation mechanism which is operated at an air pressure of a second pressure value or less, the second pressure value being lower than the first pressure value;
a compressed air generator which generates compressed air to be supplied to the first air operation mechanism and the second air operation mechanism;
a first discharge air supply unit which supplies air discharged from the first air operation mechanism to the second air operation mechanism when a pressure value of the air discharged from the first air operation mechanism is higher than a pressure value of the air supplied from the compressed air generator to the second air operation mechanism;
a third air operation mechanism which is operated at an air pressure of a third pressure value or less, the third pressure value being lower than the second pressure value; and
a second discharge air supply unit which supplies air discharged from the second air operation mechanism to the third air operation mechanism when a pressure value of the air discharged from the second air operation mechanism is higher than a pressure value of air supplied from the compressed air generator to the third air operation mechanism,
wherein the compressed air generated by the compressed air generator is further supplied to the third air operation mechanism.

* * * * *

UNITED STATES PATENT AND TRADEMARK OFFICE
CERTIFICATE OF CORRECTION

Page 1 of 1

PATENT NO.       : 10,221,998 B2
APPLICATION NO.  : 15/117828
DATED            : March 5, 2019
INVENTOR(S)      : Satoshi Masuda It is certified that error appears in the above-identified patent and that said Letters Patent is hereby corrected as shown below:

On the Title Page

Item (30), the Foreign Application Priority Data is incorrect. Item (30) should read:
-- (30) Foreign Application Priority Data
Mar. 11, 2014 (JP) .................. 2014-047377 --

Signed and Sealed this
Twenty-fifth Day of June, 2019

Andrei Iancu
*Director of the United States Patent and Trademark Office*